United States Patent

Burgdorf et al.

[11] 4,121,872
[45] Oct. 24, 1978

[54] PRESSURE CONTROL UNIT FOR VEHICULAR HYDRAULIC BRAKE SYSTEMS

[75] Inventors: Jochen Burgdorf, Offenbach; Dieter Kircher, Frankfurt am Main, both of Germany

[73] Assignee: ITT Industries, Inc., New York, N.Y.

[21] Appl. No.: 813,928

[22] Filed: Jul. 8, 1977

[30] Foreign Application Priority Data

Aug. 25, 1976 [DE] Fed. Rep. of Germany ....... 2638190

[51] Int. Cl.² ............................................. B60T 13/00
[52] U.S. Cl. ..................................... 303/6 C; 303/115
[58] Field of Search ................. 303/6 C, 22 R, 22 A, 303/115

[56] References Cited

U.S. PATENT DOCUMENTS

| 3,650,573 | 3/1972 | Inada | 303/6 C |
| 3,695,732 | 10/1972 | Stelzer | 303/6 C |

Primary Examiner—Trygve M. Blix
Assistant Examiner—Reinhard J. Eisenzopf
Attorney, Agent, or Firm—John T. O'Halloran; Alfred C. Hill

[57] ABSTRACT

There is disclosed a combination brake-force distributor and modulator valve for an antiskid system. The normal pressure controlled piston of the brake-force distributor is at the same time used as the modulator valve of the antiskid system. In order to achieve antiskid control the piston is arranged so that is is displaced by a control piston during brake pressure reduction.

4 Claims, 1 Drawing Figure

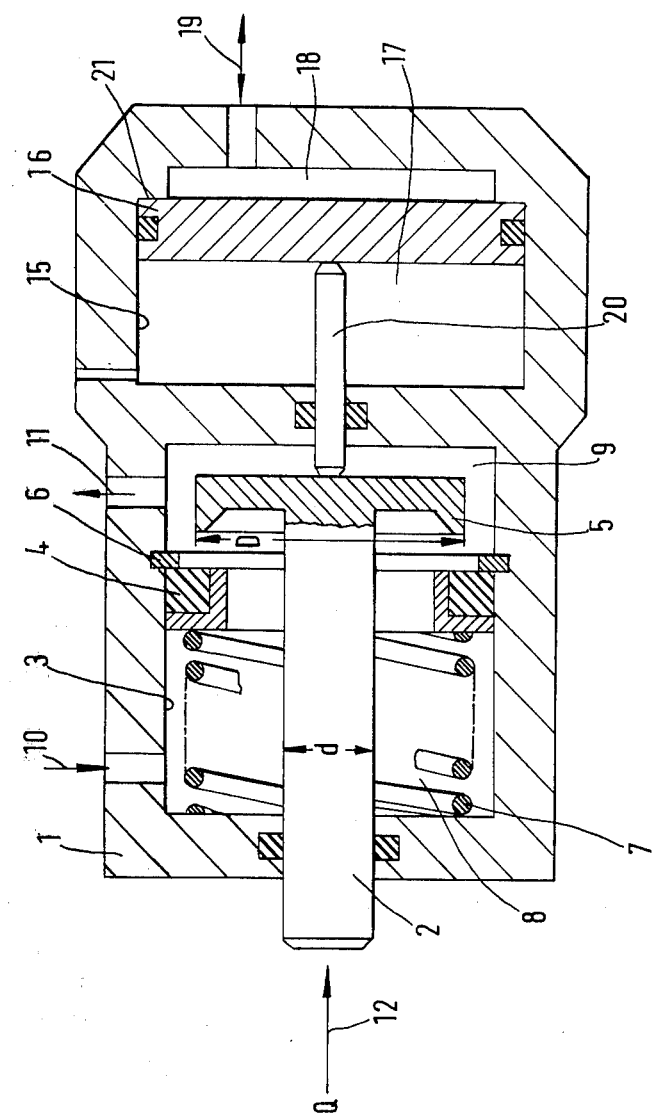

PRESSURE CONTROL UNIT FOR VEHICULAR HYDRAULIC BRAKE SYSTEMS

BACKGROUND OF THE INVENTION

This invention relates to a pressure control unit for vehicular hydraulic brake systems with a braking force distributor featuring a piston arrangement prestressed by a control force into its rest position, acted upon by an outlet pressure counteracting the control force, and being movable as a result of which an outlet chamber is enlarged, the braking force distributor further featuring a normally open valve by means of which a connection is locked between an inlet and the outlet chamber as soon as the piston arrangement has moved out of its rest position against the control force.

Such a braking force distributor has come to knowledge from the German Pat. (Dt-PS) No. 1,195,185. The braking force distributor is used for balancing the braking pressures between the front and rear axles of a vehicle to which end it is interconnected in the pressure medium line between the braking pressure source and the rear axle brakes. Its fundamental mode of operation consists in that it allows full action of the pressure generated by the braking pressure source on the rear axle brakes up to a determined pressure level. When this pressure level (change point) has been reached the piston arrangement will move out of its rest position, causing the valve to close and ensuring that - as the pressure is further increasing - no further pressure (braking force limiter) or only an outlet pressure will reach the rear axle which outlet pressure is limited as compared with the inlet pressure (braking force reducer). If a limited pressure increase is to be achieved it is necessary for the piston arrangement to have another surface which can be acted upon by the inlet pressure in the direction of the control force and which is smaller than the surface acted upon by the outlet pressure in the opposite direction. The relationship of these two surfaces will determine the further pressure increase in the outlet chamber. If there is no surface acted upon by the inlet pressure there will be no further pressure increase beyond the change point, i.e. in this case the device is a braking force limiter.

Such a balancing of the braking pressures is necessary to ensure that, with various friction values, all the wheels of a vehicle will approach the lock-up limit as evenly as possible. Considering e.g. a brake system which is designed for a medium-degree braking operation without any such braking pressure balancing, a good friction value and the good braking action hence being possible will lead to a strong dynamic axle load shift as a result of which the rear wheels would already be locked before the highest braking force possible would become effective at the front wheels, while in the event of a poor friction value and of the weak braking action hence being possible conditions are completely reversed due to the small axle load shift which may then be neglected. However, even the braking pressure balancing by means of a braking force distributor cannot completely prevent the wheels from locking. All that is thereby only achieved is that the wheels of one axle are prevented from premature locking.

In order to prevent a wheel lock-up on principle, antiskid control systems have been developed which among others feature a pressure control device. Such an antiskid control system has come to knowledge from the German Printed Patent Application (Dt-AS) No. 1,530,471. The pressure control device disclosed there has a plunger which is held in its rest position by a strong spring and which is displaceable by means of a controlled auxiliary pressure against the force of the spring, thereby a control chamber being enlarged and at the same time a valve being closed which is mechanically controlled by the plunger. The valve prevents any further braking pressure supply from the pressure medium source to the control chamber while in the chamber and in the wheel brake connected therewith the braking pressure is reduced by the increase in volume of the control chamber. To this end, the auxiliary pressure is controlled such as to bring about a braking pressure which will just prevent the wheels from locking.

Up to now it was assumed that in vehicles equipped with an antiskid control system the braking pressure balancing is of minor importance since the antiskid control system provides for a better prevention of a wheel lock-up than does a braking force distributor. It was thus assumed that the braking force distributor is dispensable in such vehicles. This, however, leads to a response of the antiskid control system which is connected with the wheels of the dynamically load-relieved axle even if the optimum braking pressure has not yet been reached at the wheels of the other axle. Upon any stronger braking operation, the wheels of the dynamically load-relieved axle are thus strained up to the lock-up limit and overbraking will only be prevented by the continuous operation of the antiskid control system. This in itself is disadvantageous enough. However, if in addition one thinks of the fact that with antiskid control systems the possibility of failure has to be considered and that in such a case the brake system is to work as if no antiskid control system were provided at all, then this is a state which is intolerable. In such a case, upon the failure of the antiskid control system the wheels of the dynamically load-relieved axle will very soon be overbraked as a result of which the vehicle will normally skid since it is the rear wheels that are affected.

Thus one arrives at the conclusion that despite the installation of an antiskid control system a good braking pressure balancing is needed. The most simple way to provide such an optimum brake system is to provide both devices, i.e. an antiskid control system and a braking force distributor. In consequence, however, the entire brake system will become very voluminous and expensive.

SUMMARY OF THE INVENTION

It is thus an object of the present invention to further develop a pressure control device of the type referred to at the beginning such as to achieve that it, besides being suitable for braking pressure balancing, will simultaneously be suitable for braking pressure modulation in the sense of an antiskid control, dependent on an auxiliary pressure controlled for the purpose of antiskid control.

A feature of the present invention is the provision of an improvement in a braking pressure control unit for vehicular hydraulic brake system with a brake force distributor featuring a housing having a longitudinal axis, a piston arrangement coaxial of the axis prestressed by a control force into its rest position, acted upon by an output pressure counteracting the control force, and being movable as a result of which an output chamber is enlarged, the distributor further featuring a valve which is open in its rest position and by means of which a connection is blocked between an input and output chamber as soon as the piston arrangement has moved out of its rest position against the control force, the improvement comprising a secondary piston which is acted upon by an auxiliary pressure due to an antiskid system and which acts against the control force.

Thereby it is achieved in the most simple manner that this sole braking pressure control unit performs both the braking pressure balancing and the braking pressure modulation for antiskid control. As long as the auxiliary pressure is not applied to the secondary piston the function corresponds to that of any normal braking force distributor, irrespective of whether the auxiliary pressure is not effective since there is no danger of a lock-up, or since the antiskid control system is defective. However, as soon as the antiskid control responds the braking pressure control unit will be influenced in the sense of a braking pressure modulation by the fact that the equilibrium of forces at the piston arrangement is influenced by the secondary piston, the secondary piston reducing the control force.

It is advantageous if the secondary piston can be supported at the piston arrangement against the control force. Thereby a complete pressure reduction for antiskid control will also be possible even if the piston arrangement has a surface to which - for the purpose of a better braking pressure balancing - the inlet pressure can be applied in parallel with the control force, i.e. if the parts forming the braking force distributor are also constructed in the sense of a braking pressure reducer and not as a mere braking pressure limiter.

One embodiment featuring a particularly simple design consists in that, with regard to the piston arrangement, the secondary piston is coaxially arranged in front of the outlet chamber and is supported by a pin projecting into the outlet chamber in a sealed displaceable manner, the secondary piston being supported by the pin on a surface of the piston arrangement which surface is acted upon by the outlet pressure. An essential advantage of this embodiment is also to be seen in the fact that in vehicle types which are only partially to be equipped with antiskid control devices in the remaining vehicles only the parts of the braking pressure control unit that form the braking force distributor can be used as a mere braking force distributor. These vehicles easily allow a later addition of antiskid control systems. Further, the number of parts forming the braking force distributor is lower so that they can be manufactured on a more economic scale.

An axially rigid connection between the piston arrangement and the secondary piston is achieved by the fact that no change in the volume or the pressure is caused in the outlet chamber by the relative movement of these parts.

Often a device is expediently provided in vehicles with dual circuit brake systems by means of which device a valve passage is opened or will remain open between the inlet and outlet chambers upon failure of the second brake circuit which is not led via the braking force distributor. From the German Printed Pat. application (Dt-AS) No. 2,221,074 a brake system is known in which, in parallel with the braking force distributor, a valve is arranged which is actuable by the pressure in the second brake circuit and the valve passage of which provides for a by-pass of the braking force distributor in the event of failure of the second brake circuit. In the braking force distributor known from the German Pat. (Dt-PS) No. 1,655,444 the piston arrangement is held in its rest position by a clamping element which will be released if there is pressure in the second brake circuit. As a result of these devices the braking pressure supplied to the first brake circuit via the braking force distributor will not be reduced or limited in the event of failure of the second brake circuit.

Such a device definitely also makes sense in the inventive braking pressure control unit. However, an advantageous embodiment provides that during the application of auxiliary pressure to the secondary piston the valve passage is always closed, irrespective of the second brake circuit. It is thus achieved that even upon failure of the second brake circuit antiskid control can become effective for the wheels connected to the braking pressure control unit, these wheels thus being braked in the best way possible.

BRIEF DESCRIPTION OF THE DRAWING

Above-mentioned and other features and objects of this invention will become more apparent by reference to the following description taken in conjunction with the accompanying drawing, in which, the single FIGURE of the drawing is a cross-sectional view of the braking pressure control unit in accordance with the principles of the present invention.

DESCRIPTION OF THE PREFERRED EMBODIMENT

In a housing 1 a cylinder bore 3 is provided in which a piston arrangement 2 is located. One end of the piston arrangement 2 projects out of the housing 1 in a sealed displaceable manner. In the cylinder bore 3 a valve element 4 is arranged in a displaceable manner which surrounds the piston arrangement 2 and which is slightly prestressed by a return spring 7 against a stationary abutment 6 in the housing. Together with a valve member 5 provided at the piston arrangement 2, the valve element 4 forms a valve including valve element 4 and valve member 5 by means of which the cylinder bore 3 can be subdivided into an inlet chamber 8 and an outlet chamber 9. The inlet chamber 8 can be connected with a pressure medium source of a vehicular brake system via an inlet 10. The outlet chamber 9 can be connected with wheel brake cylinders of the brake system via an outlet 11. Further, a control force Q schematically illustrated by an arrow 12 is acting on the piston arrangement 2 by means of which the piston arrangement is prestressed into its rest position as shown in the drawing. The control force Q e.g. may be applied by a firmly restrained spring in a known manner or dependent on the load of the vehicle.

Coaxially with regard to the cylinder bore 3, a further cylinder 15 is provided in which a secondary piston 16 is arranged in a sealed displaceable manner. Secondary piston 16 subdivides the cylinder 15 into a chamber 17 adjacent the outlet chamber 9 communicating with the atmosphere and into an opposite control chamber 18. The control chamber 18 has a connection 19 via which it can be supplied with auxiliary pressure controlled by an antiskid control system. A pin 20 is led from the chamber 17 into the outlet chamber 9 in a sealed displaceable manner. The piston arrangement 2 can be supported at the secondary piston 16 via the pin 20, the secondary piston 16 on its part being supported in its rest position by a shoulder 21 of the housing.

Thus the following mode of operation results:

During a normal braking action pressure medium is supplied to the inlet 10, at first flowing unhindered between valve element 4 and valve member 5 to the outlet 11 and then flows to the connected wheel brake cylinders. Thus in the inlet and outlet chambers 8/9 a pressure is built up which corresponds to the pressure of the pressure medium source. The pressure is applied to the piston arrangement on a cross-sectional surface d against the control force Q. As soon as this pressure overcomes the control force Q the piston arrangement -reference being made to the drawing - is displaced to the left, the valve edge 5 thus abutting the valve element 4 and hence separating the inlet chamber 8 from the outlet chamber 9.

The pressure prevailing in the inlet chamber 8 from now onwards is acting upon the piston arrangement 2 on a surface D - d to the right while the pressure prevailing in the outlet chamber 9 acts on the piston arrangement on a surface D to the left. The pressure in the inlet chamber 8 increasing, thus the valve edge 5 will always be lifted off from the valve element 4 that long until the piston arrangement 2 will have regained its balance. Thus a reduced pressure build-up is taking place in the outlet chamber 9. The pressure curve achieved in the outlet chamber 9 during the pressure reduction is the same as that obtained during the pressure build-up. The piston arrangement 2 and the valve element 4 are moved to the left, the outlet chamber 9 thus being enlarged, for the purpose of adapting the pressures between the inlet chamber 8 and the outlet chamber 9 until this object will have been achieved.

The mode of operation described so far is that of a known braking force distributor the principle of which is based on the fact of the piston arrangement's always being displaced into a balanced position in which the outlet pressure determined by the control force Q and by the inlet pressure as well as by the surfaces d, D is achieved in correspondence with the desired pressure curve. During this operation the remaining parts are kept in their rest positions since auxiliary pressure will be built up in the control chamber 18 only if the antiskid control system becomes active. As long as this is not the case, the pin 20 is acted upon by the outlet pressure in the outlet chamber 9 during the braking operation, thus keeping the secondary piston 16 in its rest position.

Upon a lock-up, however, auxiliary pressure is built up in the control chamber 18, the secondary piston thus being displaced to the left. The force transmitted by the secondary piston 16 to the piston arrangement 2 via the pin 20, in correspondence with the level of the auxiliary pressure, displaces the piston arrangement 2 to the left, the outlet chamber 9 thus being enlarged and hence the pressure in the outlet chamber 9 and in the connected wheel brake cylinders being reduced. Thus, in this case the piston arrangement 2 and the valve element 4 are used as the plunger of an antiskid control system. After the antiskid control is terminated the secondary piston 16 and the pin 20 will return into their rest positions, the normal function of a braking force distributor being again immediately available.

Even if an antiskid control system fails this function of a braking force distributor will always be available, since in that case the secondary piston will not influence the piston arrangement. No strong emergency spring or the like is required here which in the known antiskid control systems holds the plunger in its rest position.

While we have described above the principles of our invention in connection with specific apparatus it is to be clearly understood that this description is made only by way of example and not as a limitation of the scope of our invention as set forth in the objects thereof and in the accompanying claims.

We claim:

1. An improvement in a braking pressure control unit for a vehicular hydraulic brake system including a brake force distributor having a housing with a longitudinal axis; a piston arrangement disposed coaxially of said axis within said housing; said piston arrangement being prestressed by a control force on one end thereof into its rest position; a valve element disposed within said housing coaxial of said axis and encircling said piston arrangement adjacent the other end thereof; and a valve member secured to said other end of said piston arrangement; said valve member defining an input chamber adjacent said piston arrangement and an ouptut chamber adjacent a surface of said valve member remote from said piston arrangement; said surface of said valve member being acted upon by an output pressure in said output chamber counteracting said control force; said valve member being movable to enlarge said output chamber and to block a connection between said input chamber and said output chamber when said piston arrangement is moved out of said rest position against said control force, said improvement comprising:

a secondary piston disposed coaxial of said axis within said housing in a spaced relationship with said surface of said valve member and said piston arrangement, said secondary piston being acted upon by an auxiliary pressure which acts against said control force, said auxiliary pressure being provided by an antiskid system;

2. An improvement according to claim 1, wherein said secondary piston acts against said control force through said piston arrangement.

3. An improvement according to claim 2, wherein said secondary piston is in contact with a pin projecting into said output chamber in a sealed displaceable manner, said pin contacting said surface of said valve member.

4. An improvement according to claim 3, wherein said pin axially abuts said surface of said valve member and said secondary piston.

* * * * *